US007258829B2

(12) United States Patent
Steidl et al.

(10) Patent No.: US 7,258,829 B2
(45) Date of Patent: Aug. 21, 2007

(54) TIRE CURING SYSTEM AND METHOD

(75) Inventors: Larry Eugene Steidl, Akron, OH (US);
George Michael Stoila, Jr., Tallmadge, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 432 days.

(21) Appl. No.: 10/603,635

(22) Filed: Jun. 25, 2003

(65) Prior Publication Data
US 2004/0026831 A1    Feb. 12, 2004

Related U.S. Application Data (62) Division of application No. 09/530,829, filed as application No. PCT/US97/20655 on Nov. 14, 1997, now Pat. No. 6,610,238.

(51) Int. Cl.
*B29C 35/02* (2006.01)
*B29C 33/20* (2006.01)

(52) U.S. Cl. .................. 264/334; 264/326; 425/47

(58) Field of Classification Search ............ 264/315, 264/326, 219, 334; 425/28.1, 47, 450.1
See application file for complete search history.

(56) References Cited

U.S. PATENT DOCUMENTS

| | | | |
|---|---|---|---|
| 3,932,079 A | 1/1976 | Legostaev et al. | |
| 4,728,274 A | 3/1988 | Siegenthaler | |
| 5,316,458 A | * | 5/1994 | Lesneski .................. 425/34.1 |
| 5,622,669 A | 4/1997 | Dailliez et al. | |
| 5,631,028 A | 5/1997 | Mizokawa et al. | |
| 5,681,594 A | 10/1997 | Irie | |
| 5,741,528 A | 4/1998 | Amano et al. | |
| 5,746,964 A | 5/1998 | Ureshino et al. | |
| 5,820,885 A | 10/1998 | Irie | |

FOREIGN PATENT DOCUMENTS

| DE | 196 084 A1 | 3/1907 |
|---|---|---|
| DE | 1 204814 | 3/1922 |

(Continued)

OTHER PUBLICATIONS

International Search Report dated Sep. 28, 1998.

*Primary Examiner*—Mathieu D. Vargot
(74) *Attorney, Agent, or Firm*—Brouse McDowell; Roger Emerson; Heather Barnes (57) ABSTRACT

This invention relates to a tire curing system having a plurality of molds disposed in side by side relation, transporting means for transporting green tires to the tire curing system, loading means for loading a green tire into a bottom mold half of one of the molds, mold closing means for closing a top mold half over the bottom mold half, self-locking means for locking the top mold half to the bottom mold half, curing means for curing the green tires, mold opening means for opening the top mold half from the bottom mold half, unloading means for unloading the cured tire from the bottom mold half and take-away means for carrying the cured tires away from the curing system. The loading means and the unloading means include a movable robot and the mold closing means and the mold opening means include a movable manipulator. The robot and the manipulator move in straight lines.

4 Claims, 8 Drawing Sheets

FOREIGN PATENT DOCUMENTS

| | | |
|---|---|---|
| DE | 44 34 406 A1 | 3/1995 |
| EP | 0 712 704 A2 | 5/1996 |
| EP | 0 754 530 B1 | 1/1997 |
| EP | 0 510 332 B1 | 5/1998 |
| FR | 2 619 337 A1 | 2/1989 |
| JP | 60-159010 | 8/1985 |
| JP | 3-197007 | 8/1991 |
| JP | 4-323010 | 11/1992 |
| JP | 5-77249 | 3/1993 |
| JP | 7-1469 | 1/1995 |
| JP | 7-60753 | 3/1995 |
| JP | 7-80845 | 3/1995 |
| JP | 7-80846 | 3/1995 |
| JP | 7-96526 | 4/1995 |
| JP | 7-100834 | 4/1995 |
| JP | 7-117055 | 5/1995 |
| JP | 8-127025 | 5/1996 |
| JP | 8-127026 | 5/1996 |
| JP | 8-132442 | 5/1996 |
| JP | 8-150623 | 6/1996 |
| JP | 8-164527 | 6/1996 |
| JP | 8-164528 | 6/1996 |

* cited by examiner

TIRE CURING SYSTEM AND METHOD

This divisional patent application claims priority to patent application Ser. No. 09/530,829, which was filed on May 3, 2000 now U.S. Pat. No. 6,610,238, which claims priority to PCT application PCT\US97\20655, which was filed on Nov. 14, 1997. The inventorship remains the same.

TECHNICAL FIELD

This invention pertains to the art of methods and apparatuses for the production of pneumatic tires, and more specifically, to methods and apparatuses for a self-locking mold cure system.

BACKGROUND ART

It is well known in the art to cure, i.e., vulcanize, green tires using a tire press. Typically tire presses use molds comprising top and bottom mold halves, within which the green tire is cured. The tire press includes devices for opening the mold, that is, lifting the top mold half from the bottom mold half, loading the green tire into the bottom mold half, and closing the top mold half upon the bottom mold half, thereby encasing the green tire within the tire mold. Heat mediums, such as steam, are then transferred to the mold from the outside of the mold as well as from the inside. A tire bladder is inserted inside the mold and the green tire and is used both to cure and to shape the green tire. Once the green tire is cured, the tire press then opens, that is, lifts the top mold from the bottom mold, revealing a cured tire which is then unloaded from the tire press. This cycle can be repeated as often as required.

One of the problems with this conventional type of tire press is that many devices are underutilized. The mold closing device, for example, closes the mold then sits idle while the green tire is cured. Only after the green tire is cured and unloaded and another green tire is loaded can the mold closing device be used again. The mold opening device, the green tire loading device and the cured tire unloading device are similarly underutilized. This means that the capital resources necessary for such tire presses are not being economically used.

Many attempts have been made to reduce these problems. For example, U.S. Pat. No. 3,932,079 to Legostave et al., discloses a tire vulcanizing apparatus that includes a series of vulcanizing presses arranged in a row. In short, Legostave et al. disclose an attempt at using a conventional tire press and moving it along rails over a line of tire molds. One of the problems associated with this apparatus are that the molds cannot be treated individually, but only in couplets of two. Another problem is that there is no provision for an independent loading device or a take-away conveyor. What is needed is a more flexible tire curing system.

U.S. Pat. No. 4,728,274 to Siegenthaler discloses a tire curing apparatus in which a number of mobile curing units are selectively moved along a loop circuit. This leads to a complex transport system for the mobile curing units.

U.S. Pat. No. 5,622,669 to Dailliez et al. discloses a tire vulcanization apparatus in which tire molds are transferred from a loading/unloading device into a chamber that receives several tire molds. The loading/unloading device is stationary. This apparatus makes it difficult to cure tires having different cure cycle times.

European Patent Application EP 0 510 332 A2 describes a mold changing apparatus including a row of mold stations, a moveable manipulator, and a mold preparing station provided within the row of mold stations. To use this apparatus, each mold must be carried by forklift or crane to each mold station. The manipulator combines the functions of opening/closing molds and loading/unloading tires. This combined use leads to operational inefficiencies.

The present invention provides methods and apparatuses for curing tires using a self-locking mold cure system with shared mold open, unload, load and close devices. The difficulties inherent in the art are therefore overcome in a way that is simple and efficient, while providing better and more advantageous results.

DISCLOSURE OF INVENTION

The invention relates to a tire curing system having a plurality of molds comprising loading means for loading green tires into a bottom half mold, mold closing means for placing a top mold half over the bottom mold half, self-locking means for locking the top mold half to the bottom mold half, curing means for curing the green tires, mold opening means for removing the top mold half from the bottom mold half, unloading means for unloading cured tires from the bottom mold half and take-away means for taking the cured tires away from the curing system.

The loading means and the unloading means include a moveable robot. The mold closing means and the mold opening means include a moveable manipulator, and movements of the robot and the manipulator are in a straight line.

The invention also relates to a method for curing a first green tire using a curing system having four horizontally spaced parallel process lines with a plurality of stations along each process line. Each of the four process lines has the same number of stations. The four process lines include a manipulator process line, a mold load-unload process line, a robot tire handling line, and a green tire delivery process line. The method comprises the steps of:

depositing the first green tire at a first station on the green tire delivery process line;

moving a robot along the robot tire handling line to a first station on the robot tire handling line;

moving a manipulator along the manipulator process line to a first station on the manipulator process line;

lifting a first top mold half from a bottom mold half positioned at the first station on the manipulator process line with the manipulator;

moving the first bottom mold half to a first station on the mold load-unload process line;

placing the first green tire on the first bottom mold half with the robot;

moving the robot along the robot tire handling line as required;

moving the first bottom mold half to the first station on the manipulator process line;

placing the first top mold half onto the first bottom mold half with the manipulator;

moving the manipulator along the manipulator process line to other stations as required;

vulcanizing the first green tire into a first cured tire;

moving the manipulator along the manipulator process line to the first station on the manipulator process line;

lifting the first top mold half from the first bottom mold half with the manipulator;

moving the robot along the robot tire handling line to the first station on the robot tire handling line;

moving the first bottom mold half to the first station of the mold load-unload process line;

removing the first cured tire from the first bottom mold half with the robot;

moving the first bottom mold half to the first station on the manipulator process line; and, placing the first cured tire on a take-away conveyor with the robot.

DETAILED DESCRIPTION OF THE INVENTION

Figure 1:
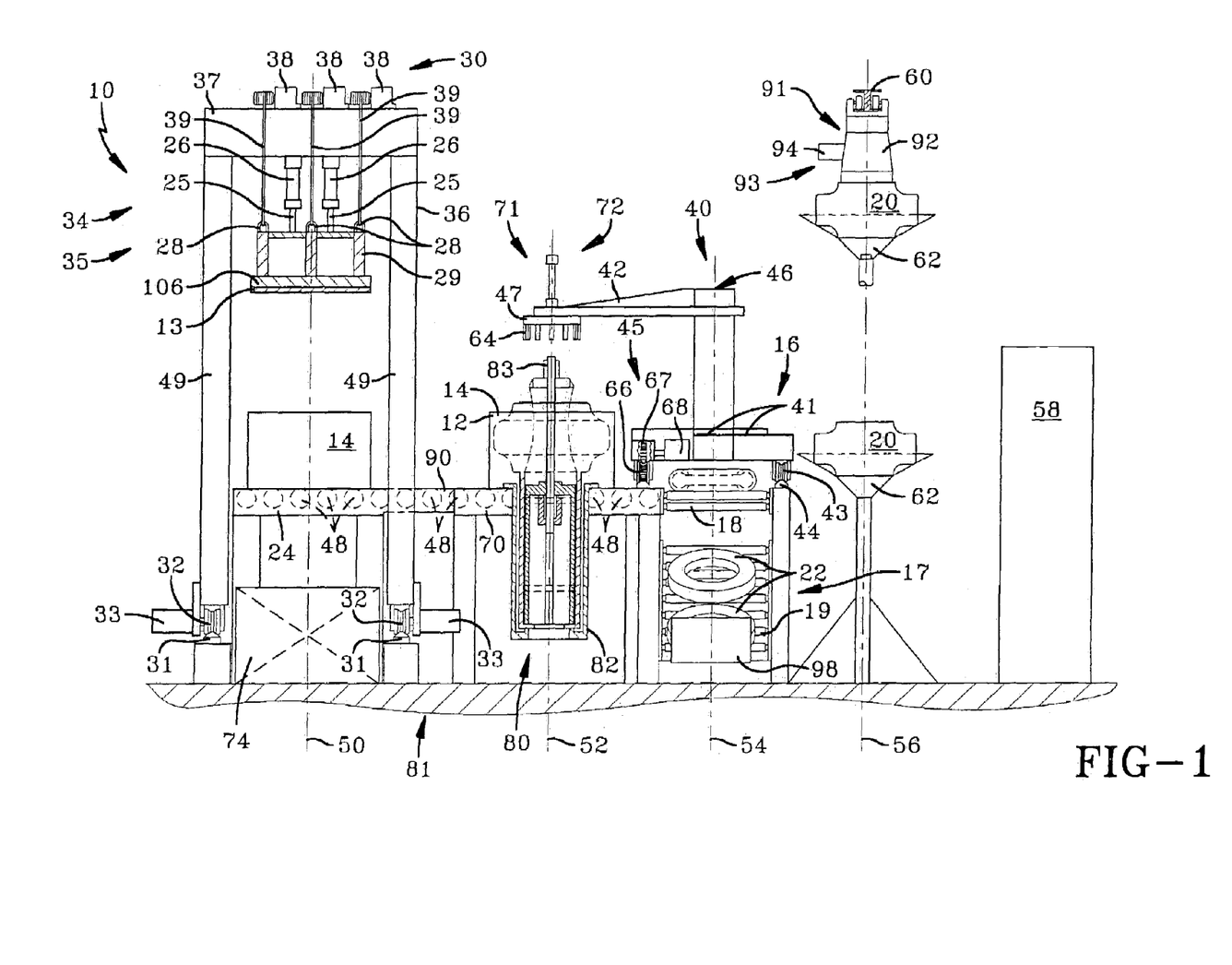
FIG. 1 is a sectional elevation view of the tire curing system of this invention taken along line 1—1 in FIG. 2 showing the manipulator and the robot.
Figure 2:
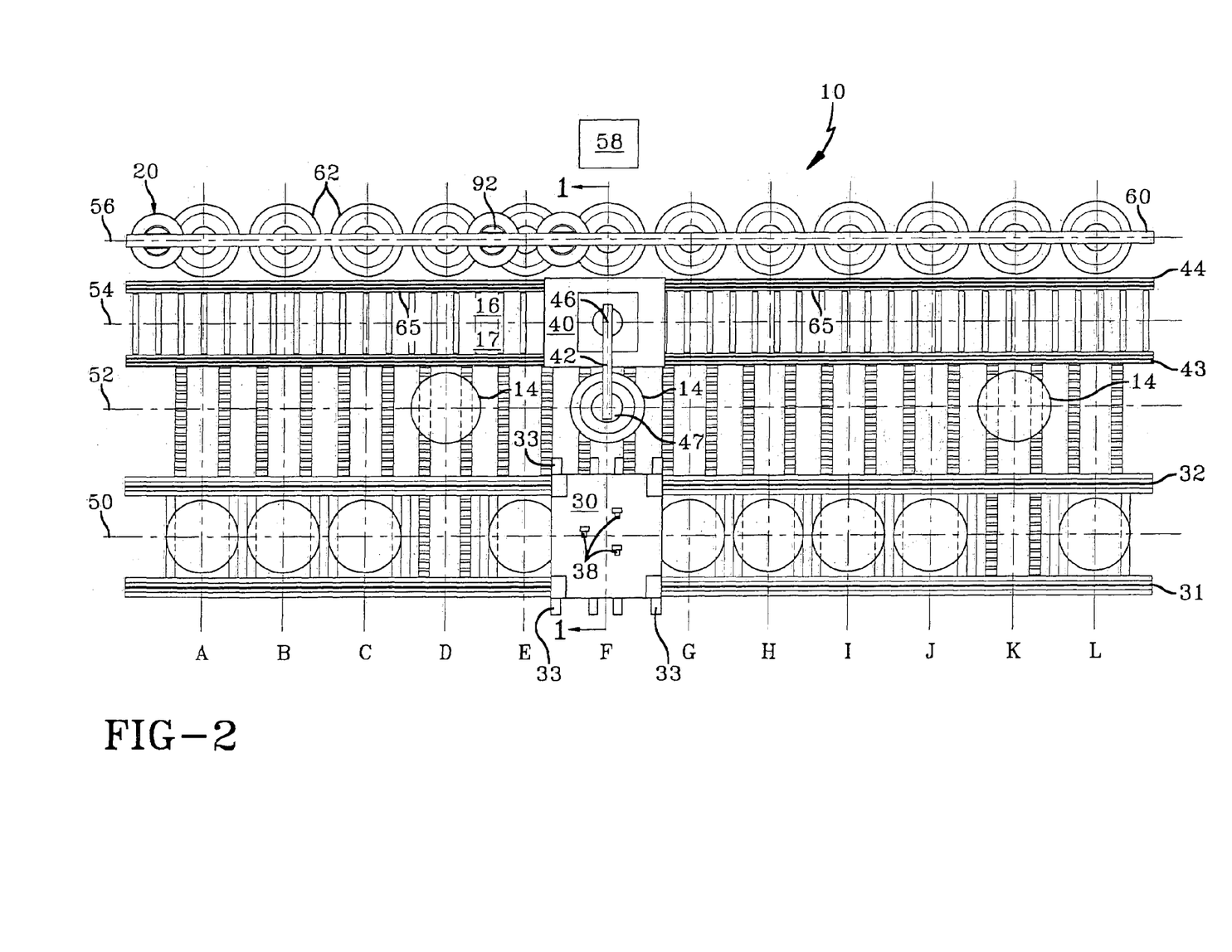
FIG. 2 is a plan view of the tire curing system of this invention showing the stations along each process line.

Referring now to the drawings wherein the showings are for purposes of illustrating a preferred embodiment of the invention only and not for purposes of limiting the same, FIGS. 1–2 show a tire curing system 10 for use in curing a green tire 20 into a cured tire 22 using a tire mold 12 that has a top mold half 13 and bottom mold half 14. It is to be understood that the green tire 20 can be any type of tire such as that required to make a passenger tire, a truck tire, an airplane tire or other tires as well.

Figure 7:
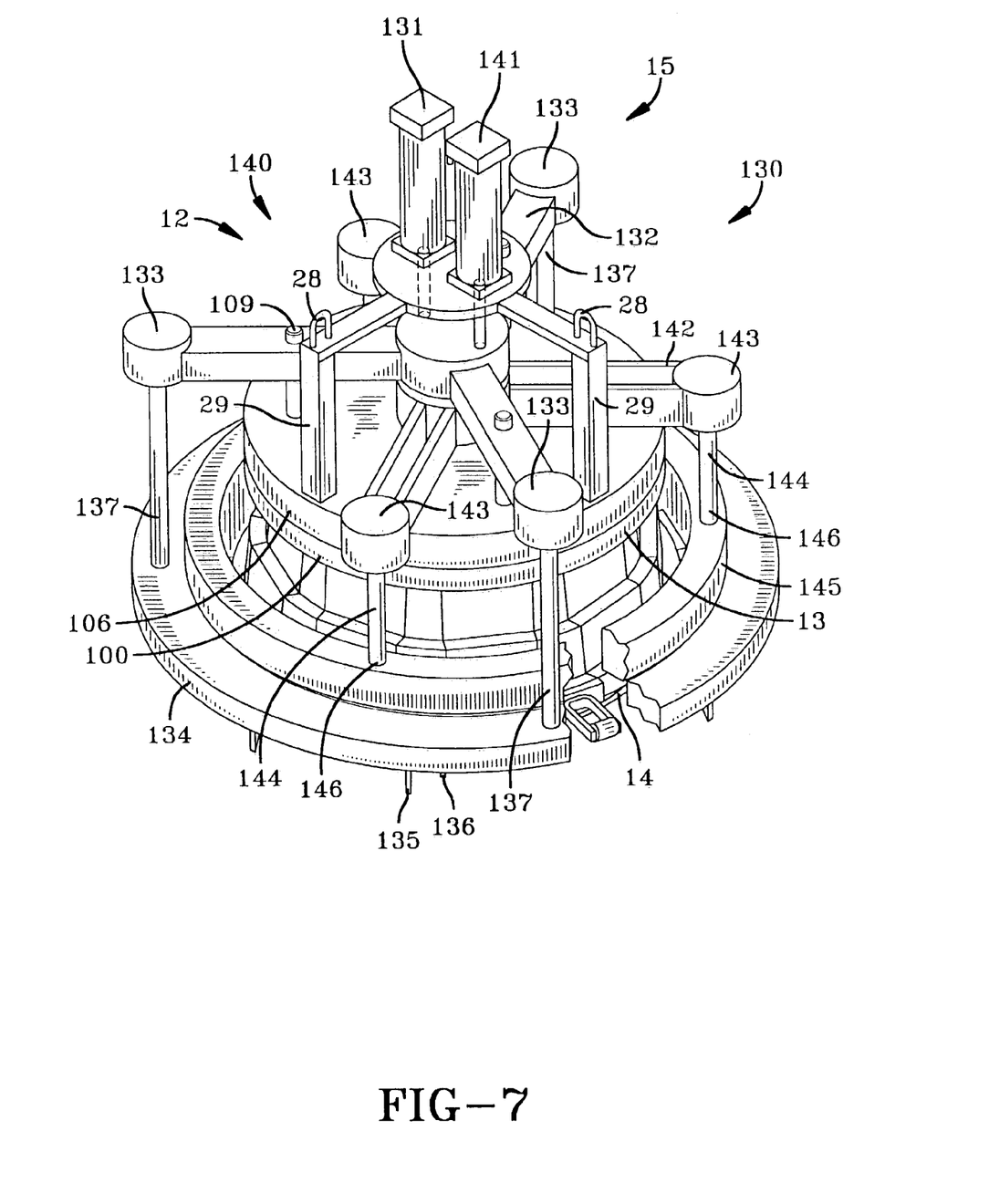
FIG. 7 is a perspective side view of the segmented mold of FIG. 5 but also showing the actuator mechanism and the lock mechanism.
Figure 8:
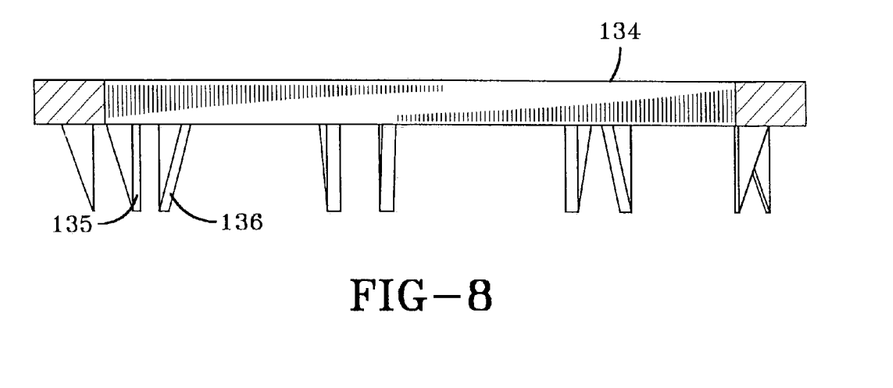
FIG. 8 is a sectional view of the actuator ring showing the actuator wedges.
Figure 9:
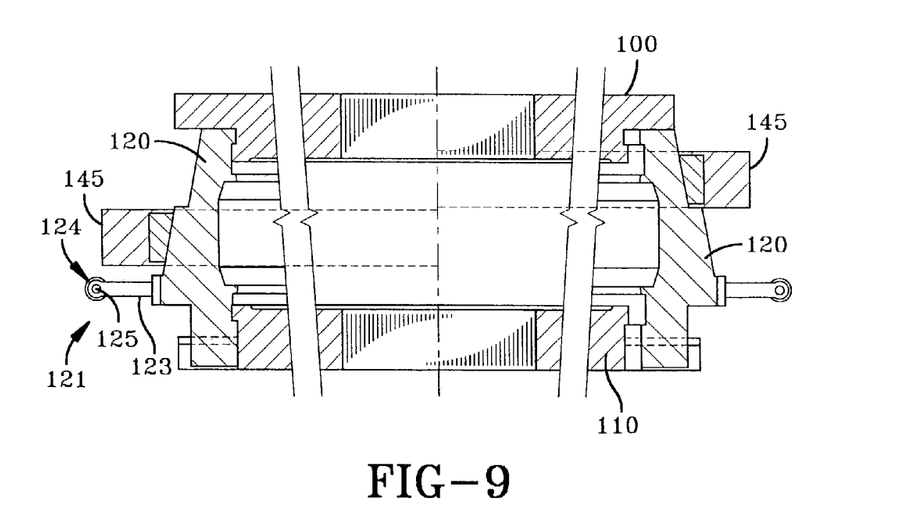
FIG. 9 is a sectional view of the self-locking segmented tire mold of this invention showing the segmented mold in a fully closed position and the lock ring in a locked position on the left side of the Figure and showing the segmented mold in partially open position and the lock ring in an un-locked position on the right side of the Figure.

With continuing reference to FIGS. 1 and 2, the tire curing system 10 of this invention includes transporting means 91 for transporting green tires 20 to the tire curing system 10, loading means 71 for loading green tires 20 into the bottom mold half 14, mold closing means 34 for closing the top mold half 13 onto the bottom mold half 14, self-locking means 15, as shown in FIG. 7, for locking each mold 12 during the curing process, curing means 81 for curing the green tires 20, mold opening means 35 for opening the mold 12, unloading means 72 for unloading cured tires 22 from mold 12 and take-away means 17 for taking the cured tires 22 away from the tire curing system 10. Controls for the various components of the tire curing system 10 may be centralized within a control panel 58.

Still referring to FIGS. 1 and 2, in the preferred embodiment the tire curing system 10 is arranged around four horizontally spaced, substantially parallel process lines, identified as a manipulator process line 50, a mold load-unload process line 52, a robot tire handling line 54 and a green tire delivery process line 56. As best seen in FIG. 2, each process line has a number of stations A–L. Thus, each process line has first station A through a twelfth station L. It should be noted that the exact number of stations can be determined using sound engineering judgment. In this preferred embodiment, 12 stations are provided so that any ten stations can be used for curing the green tires 20, leaving two stations available for servicing or replacing of the tire molds 12 or for any maintenance needs.

With reference to FIG. 1, it should be noted that the manipulator process line 50 and the mold load-unload process line 52 could, in fact, be a single process line. In other words, the loading means 71, the mold closing means 34, the curing means 81, the mold opening means 35, and the unloading means 72 could all be included in a single process line. This would be the case, for example, if an arm 42 of a later to be described robot 40 moved under the top mold half 13 (table top mold half 13 being held by a later to be described manipulator 30), to load green tires 20 and unload cured tires 22 from the bottom mold half 14 while the bottom mold half 14 was stationed along the manipulator process line 50. In the present embodiment, the manipulator 30 is positioned horizontally spaced (on the manipulator process line 50) from the mold load-unload process line 52 to decrease the required height of the manipulator 30.

With reference now to FIGS. 1 and 2, the transporting means 91 preferably includes a monorail 60 running along the green tire delivery process line 56. Slidably connected to the monorail 60 are a plurality of green tire carriers 92 each of which selectively holds a green ire 20. The green tire carriers 92 are transported along the monorail using a carrier driving means 93, which can be of any type chosen with sound engineering judgment. In the preferred embodiment, the carrier driving means 93 comprises a driving motor 94 operatively connected to each green tire carrier 92 making each green tire carrier 92 self propelled. The green tire carriers 92 transport the green tires 20 along the green tire delivery process line 56 and then deposit the green tires 20 on pans 62 where they await the curing process as will be discussed below. The pans 62 can be vertically height adjusted in order to maintain the green tire 20 at a predetermined height. With continuing reference to FIGS. 1 and 2, the robot 40 may be a 6-axes industrial robot mounted on a platform or base 41 that is self propelled. The self propelled platform 41 may have platform rollers 43 moveable on platform rails 44 with at least one of the platform rollers 43 having gear teeth for engagement by teeth on a driving gear 67 mounted on the platform 41 and driven by a motor 68. Thus, the robot 40 is slidably mounted to the platform rails 44 that run along the robot tire handling line 54. Controls that may be within the control panel 58 are provided to rotate the driving gear 67 the desired amount and in the desired direction along the robot tire handling line 54 so as to move the platform 41 to the desired station. An encoder strip 65, shown in FIG. 2, may be provided on the platform rail 44 to indicate the location of the platform 41 and the robot 40. Still referring to FIGS. 1 and 2, it is preferred that the robot 40 includes both the loading means 71 for loading green tires 20 and the unloading means 72 for unloading cured tires 22.

The robot 40 has an arm 42 that is rotatable mounted on the platform 41 and selectively pivots about pivot point 46. The arm 42 includes a tire gripper 47 that may have moveable fingers 64 for gripping the green tire 20 and the cured tire 22. To load a green tire 20 the arm 42 pivots until the tire gripper 47 of the arm 42 is in position to grip a green tire 20 from a pan 62. The arm 42 then pivots about 180° till the green tire 20 is positioned over the bottom mold half 14. The bottom mold half 14, at this point, is positioned on the mold load-unload process line 52. The arm 42 is then lowered and the tire gripper 47 releases the green tire 20 into the bottom mold half 14. To unload a cured tire 22, the arm 42 pivots until the tire gripper 47 of the arm 42 is in position to grip a cured tire 22 from the bottom mold half 14. The arm 42 then pivots about 90° till the cured tire 22 is positioned over the take-away means 17. The arm 42 is then lowered and the tire gripper 47 releases the cured tire 22 onto the take-away means 17.

Figure 10:
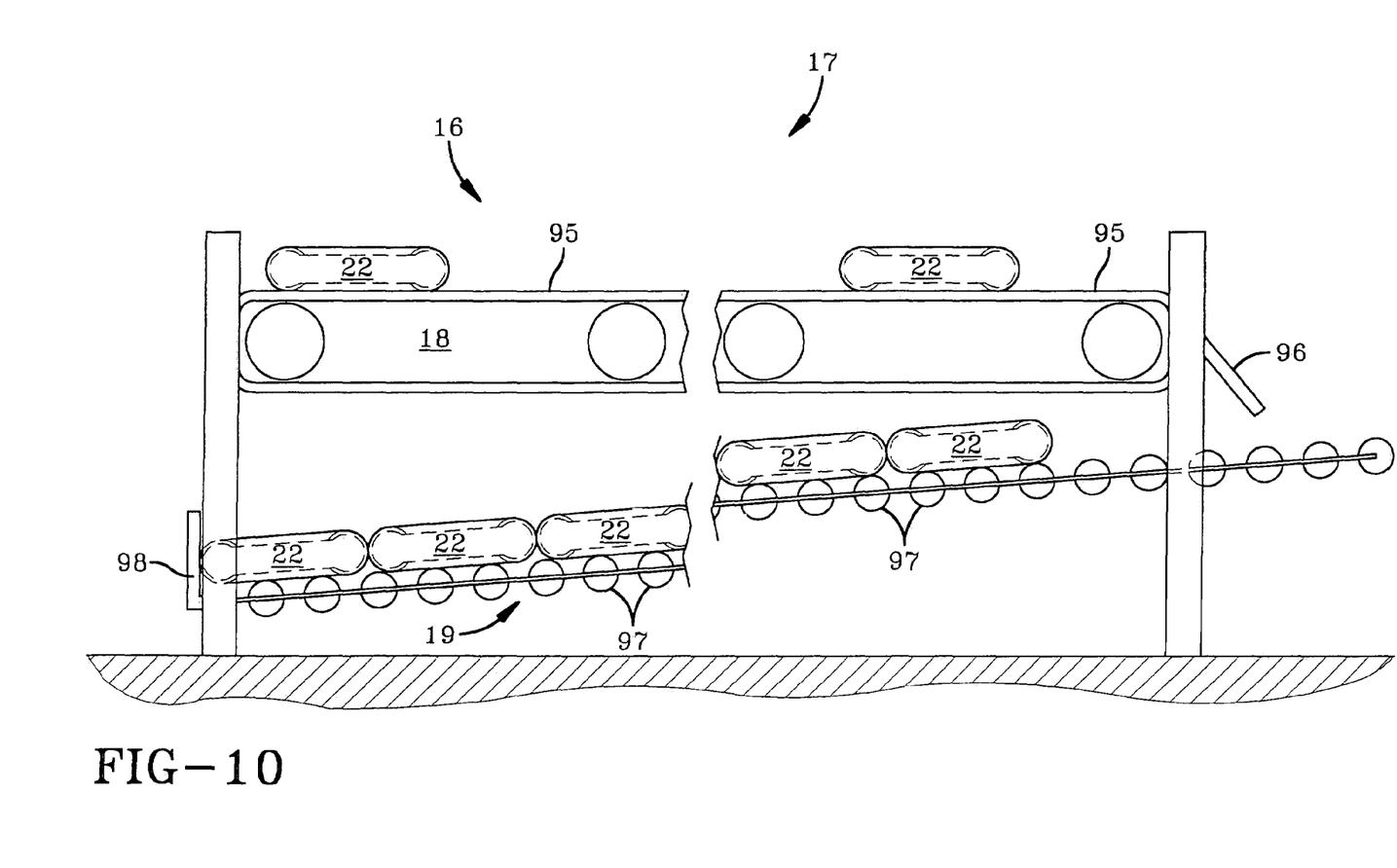
FIG. 10 is a schematic elevation view of the take-away conveyor showing an upper belt conveyor and a lower level with an inclined roller conveyor.

With reference now to FIGS. 1, 2 and 10, the take-away means 17 takes the cured tires 22 out of the tire curing system 10 and is preferably positioned, like the robot 40, along the robot tire handling line 54. Preferably, the take-away means 17 includes a take-away conveyor 16 that has upper and lower levels 18, 19 as shown in FIGS. 1 and 10. In the preferred embodiment, the cured tires 22 are conveyed along the upper level 18 and then dropped to the lower level 19 using a tire transfer member 96 operatively connected to the upper level 18 before they are conveyed out of the tire curing system 10. This clears the upper level 18 and provides time for the cured tires 22 to properly cool on the lower level 19 before they are sent for further processing. It also provides time to ventilate any fumes that may occur. The upper level 18 may be a driven conveyor belt 95 and the lower level 19 may be a tilted conveyor, as shown in FIG. 10, comprising conveyor rollers 97. A stop member 98 that is operatively connected to the lower level 19 may be used to hold the cured tires 22 on the lower level 19 until it is desired to remove them.

Referring to FIGS. 1 and 2, it is preferred that the manipulator 30 includes both the mold closing means 34 and the mold opening means 35. The manipulator 30 may be a gantry 36 having side frames 49 on gantry rollers 32 supported on manipulator rails 31 that run along the manipulator process line 50. Manipulator driving means 33 such as individual drive motors 33 may be mounted on at least two of the gantry side frames 49. The drive motors 33 are used to selectively drive the gantry 36 along the manipulator process line 50. A manipulator process line table 24, supports the bottom mold halves 14 on rollers 48 that are rotatable by any rotating means commonly known in the art, while the manipulator 30 raises and lowers the top mold halves 13 with respect to the bottom mold halves 14. In this way the tire mold 12 is opened and closed. The manipulator 30 has a top member 37 with hoists 38 for selectively raising and lowering an attachment frame 29. Hoist cables 39 operatively connect the hoists 38 to hooks 28 that are mounted to the attachment frame 29. The attachment frame 29 is selectively attached to any top mold half 13 to be raised or lowered. Coordination of the drives of the hoists 38 guide the top mold half 13 in a substantially level manner as the top mold half 13 is raised and lowered.

Figure 3:
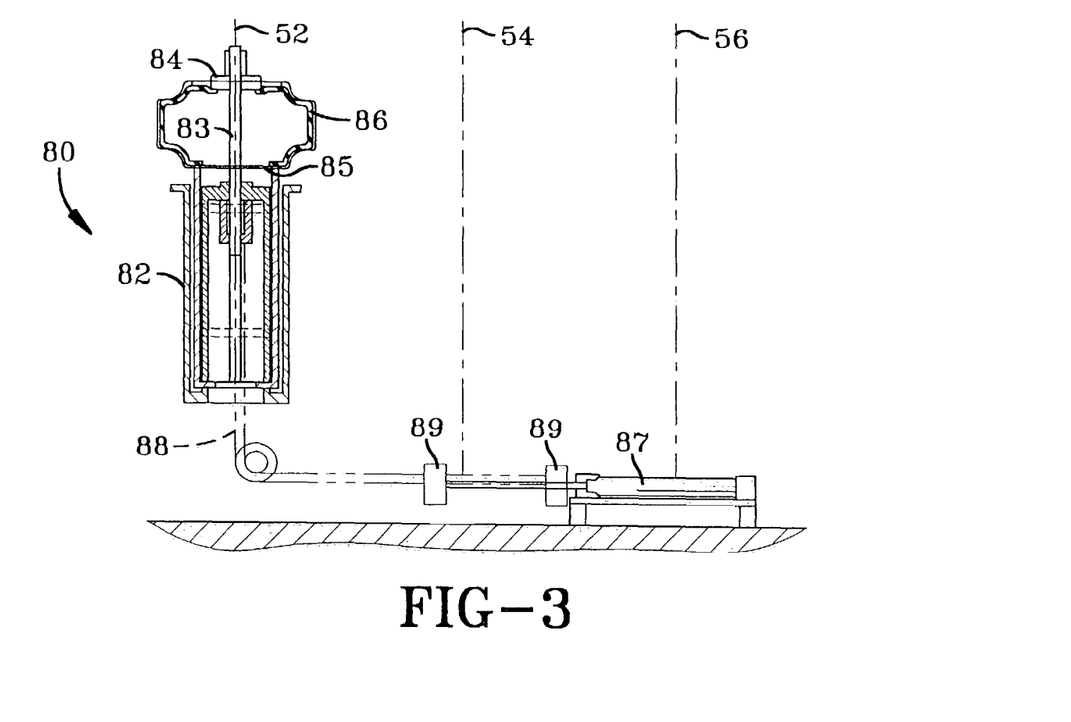
FIG. 3 is a partial elevation view showing the center-mechanism used to insert the bladder within the tire mold.

Referring now to FIGS. 1–3, the curing means 81 includes a mold load-unload table 70 that also has rollers 48 that are rotatable by any rotating means commonly known in the art. The mold load-unload table 70 is for holding the bottom mold half 14 while the green tire 20 is being loaded into the bottom mold half and while the cured tire 22 is being unloaded from the bottom mold half. A transport conveyor 90 also having rollers 48 that are rotatable by any rotating means commonly known in the art, is used to transport the bottom mold halves 14 back and forth between the mold load-unload table 70 and the manipulator process line table 24. Below the mold load-unload table 70, at each station, is a center mechanism 80 that includes a can assembly 82, a center post 83, a top ring 84 and a bottom ring 85. These components are used to position a bladder 86 within the green tire 20 (and therefore with the tire mold 12). The bladder 86 is used, as is commonly known in the art, to both cure and shape the green tire 20. The operation of the center-mechanism 80 is known in the art and thus will not be discussed in any detail herein. However, it is preferred that the center-mechanisms 80 are selectively moveable between the manipulator process line 50 and the mold load-unload process line 52. This permits the shaping of the green tire 20 to begin as soon as the green tire 20 has been placed inside the bottom mold half 14 and to continue while the bottom mold half 14 is moved to the manipulator process line 50. To make each center-mechanism 80 moveable, a piston cylinder 87 is operatively connected to a chain 88 using a quick connect coupling 89. The chain 88 is rigid against counter-clockwise bends and is used to operate the can assembly 82. The quick connect coupling 89 permits the piston cylinder 87 to operate the can assembly 82 while the center-mechanism 80 is positioned at the mold load-unload process line 52. Then, when the bottom mold half 13 along with the center-mechanism 80 is moved to the manipulator process line 50, the chain 88 simply disconnects at the quick connect coupling 89. After the green tire 20 has been cured and it is necessary to move the bottom mold half 13 and the center-mechanism 80 back to the mold load-unload process line 52, the chain 88 re-connects at the quick connect coupling 89.

Figure 4:
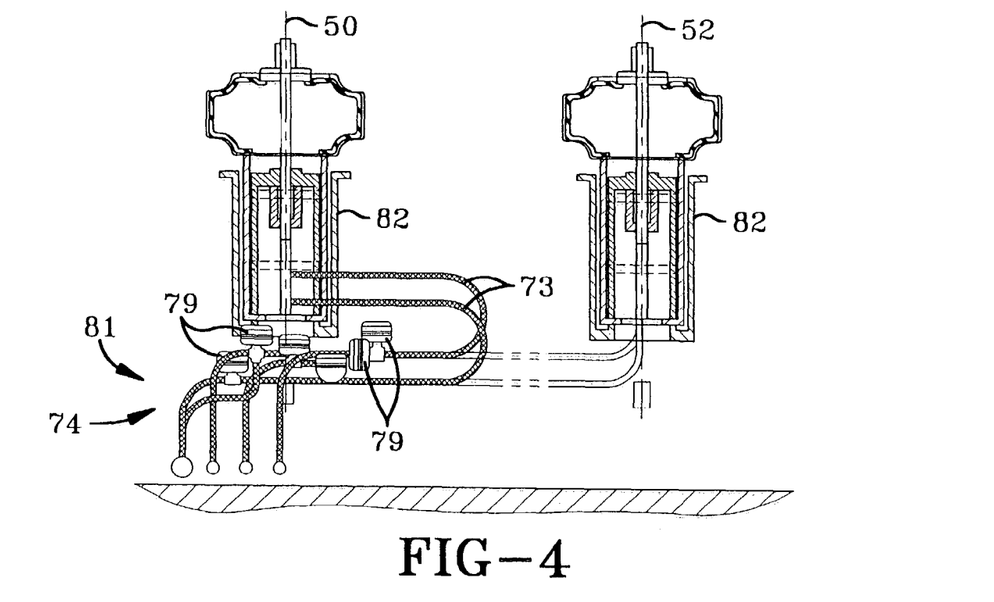
FIG. 4 is a partial elevation view showing how the curing services are supplied to the moveable can assembly.
Figure 5:
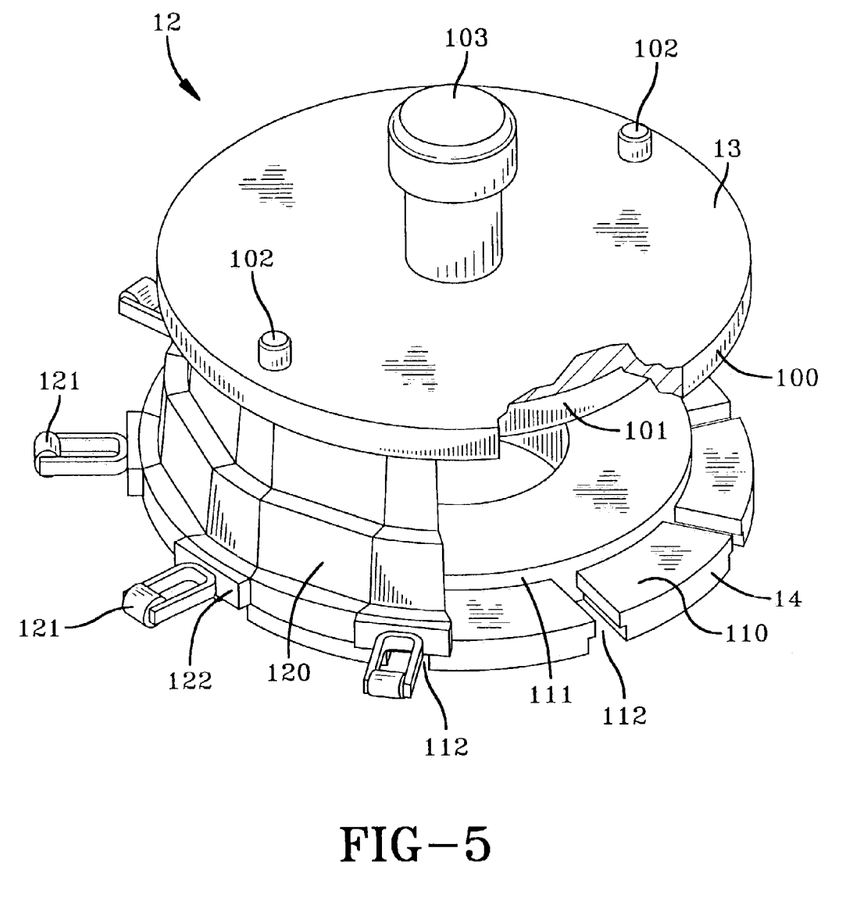
FIG. 5 is a fragmentary perspective side view of the segmented mold of this invention showing the top plate, the bottom plate and some of the segments.
Figure 6:
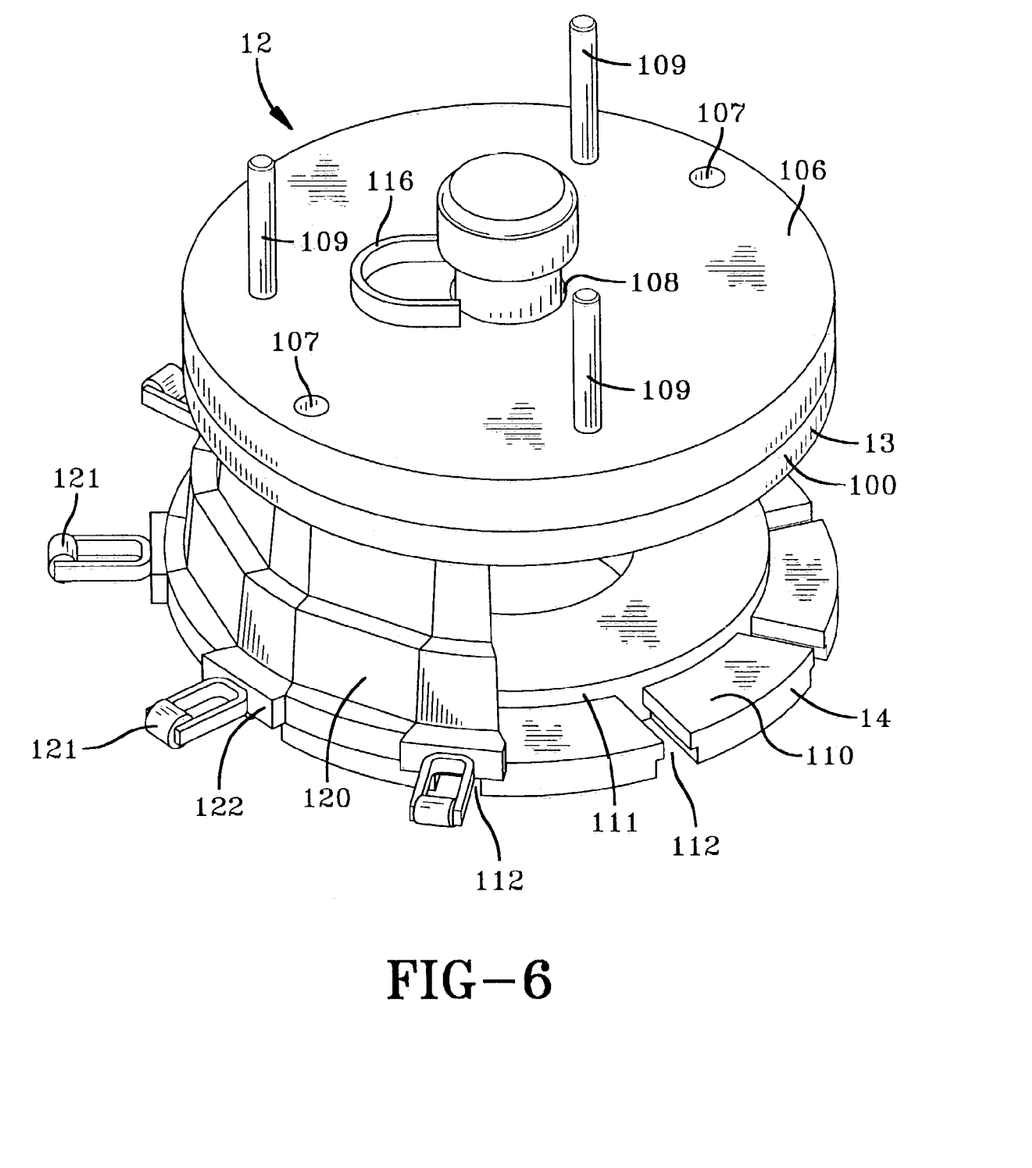
FIG. 6 is a perspective side view of the segmented mold of FIG. 5 but also showing the bolster and lock plate.

With reference now to FIGS. 1, 2 and 4, the curing means 81 also includes curing services 74 that may include several supply and drain headers for fluid means used to provide appropriate temperatures and pressures. Of course the appropriate curing services 74 can be any chosen with sound engineering judgment. Such curing services 74 are controlled using control valves 79 and are provided to service the bladder 86 as well as the tire mold 12. The use of such curing services 74 is considered known in the art and thus will not be discussed in any detail herein. What should be noted, however, is that since curing begins when the bottom mold half 14 is on the mold load-unload process line 52 and continues when the bottom mold half 14 is on the manipulator process line 50, the curing services 74 are supplied using flexible hosing 73. Preferably, the flexible hosing 73 is positioned between the control valves 79 and the bladder 86 or tire mold 12.

With reference now to FIGS. 1 and 5–7, the mold self-locking means 15 locks the top mold half 13 to the bottom mold half 14 during the curing process without the need for additional support. Thus, the manipulator 30 can be moved anywhere along the manipulator process line 50 that may be required while the green tire 20 within the tire mold 12 continues to cure. Any tire mold 12 chosen with sound engineering judgment can be used with this invention but, in the preferred embodiment the tire mold 12 is a mold known as a segmented mold. The top mold half 13 of the segmented mold 12 includes a top plate 100 having an integral platen 101. The platen 101 is a self-contained chamber for holding a heating medium such a steam or water for use in curing the green tire 20. The top mold half 13 has a central mushroom pilot 103 and side pilots 102 for use in centering and angularly orienting the top mold half 13. A bolster 106 is fixedly attached to the attachment frame 29 and is operatively connected to the top mold half 13 and has a central mushroom pilot hole 108 and side pilot holes 107 that receive the mushroom pilot 103 and side pilots 102 respectively of the top plate 100. In this way the top mold half 13 can be properly aligned with the attachment frame 29 of the manipulator 30 so that the top mold half 13 can be properly placed onto the bottom mold half 14.

Still referring to FIGS. 1 and 5–7, attached to the top portion of the bolster 106 is a plurality of guide rods 109. The guide rods 109 are used to align and attach a later to be described actuator frame 132 and a later to be described lock frame 142. A plurality of cylinders 26 attached to the top member 37 of the gantry 36 have piston rods 25 that extend down to the attachment frame 29 thereby stabilizing the attachment frame 29 as it is moved with the gantry to different stations. The bottom mold half 14 of the segmented mold 12 includes a bottom plate 110 having an integral platen 111 and a plurality of tread forming segments 120. Each of the segments 120 is mounted to a slide block 122 that slides radially within a radial slot 112 in the bottom plate 110. Each of the segments 120 has a cam-follower actuator 121 for use in sliding the segment as will be discussed further below. A horseshoe shaped lock plate 116 structurally links the tire mold 12 to an actuator ring 134 that will be discussed further below.

Still referring to FIGS. 1 and 5–7, to close the top mold half 13 onto the bottom mold half 14, an actuator mechanism 130 is used. The actuator mechanism 130 includes an actuator cylinder 131, an actuator frame 132 having actuator motors 133 and the actuator ring 134. The actuator ring 134 has first and second actuator wedges 135, 136 for use in engaging each cam-follower actuator 121 on each segment 120. To close the segmented mold 12, the actuator cylinder 131 lowers the actuator frame 132 until each of the first actuator wedges 135 engages the corresponding cam-follower actuator 121. The actuator motors 133 are then driven causing actuator rods 137 to rotate. The rotation of the actuator rods 137 causes the actuator ring 134 to rotate about the segmented mold 12. At least one of the actuator rods 137 may have gear teeth for engagement with teeth on the actuator ring 134. As the actuator ring 134 rotates, the first actuator wedges 135 engage the cam-follower actuators 121 causing the segments 120 to slide inwardly, thereby closing the segmented mold 12. The amount of rotation of the actuator ring 134 required to close the segmented mold 12 can be any amount chosen with sound engineering judgment but is preferably within the range of 5° to 15°. Once the segmented mold 12 has been closed, the actuator mechanism 130 can be lifted by the actuator cylinder 131 away from the segmented mold 12. To open the segmented mold 12, the actuator rods 137 are rotated in the opposite direction causing the actuator ring 134 to also rotate in the opposite direction. As the actuator ring 134 rotates, the second actuator wedges 136 engage the cam-follower actuators 121 causing the segments 120 to slide outwardly, thereby opening the segmented mold 12.

With continuing reference to FIGS. 1 and 5–7, to lock the top mold half 13 to the bottom mold half 14, a lock mechanism 140 is used. The lock mechanism 140 is the preferred self-locking means 15 for this invention. The lock mechanism 140 includes a lock cylinder 141, a lock frame 142 having lock motors 143, lock rods 144 with quick connect couplings 146 and a lock ring 145. To lock the segmented mold 12, the lock cylinder 141 lowers the lock frame 142 until the lock ring 145 is positioned around the segmented mold 12. This locks the segmented mold 12 in a closed position. Once the segmented mold 12 has been locked, the lock motors 143 are driven thereby disconnecting the lock rods 144 from the lock ring 145 at the quick connect couplings 146. The quick connect couplings 146 can be of any type chosen with sound engineering judgment as currently known in the art. The lock mechanism 140 can then be lifted by the lock cylinder 141 away from the segmented mold 12. To unlock the segmented mold 12, the lock mechanism 140 is lowered by the lock cylinder 141 so that the lock rods 144 engage the lock ring 145 at the quick connect couplings 146. Next, the lock motors 143 are driven causing the quick connect couplings 146 to connect with the lock rods 144. This reconnects the lock rods 144 with the lock ring 145. The lock cylinder 141 is then raised, lifting the lock ring 145 and thereby unlocking the segmented mold 12.

With reference now to FIGS. 1–7, the operation of the tire curing system 10 will now be discussed. The green tire 20 is transported to the tire curing system 10 by the green tire carrier 92 that moves along the monorail 60. The green tire 20 is then deposited on a support such as the pan 62 located at the first station A on the green tire delivery process line 56. The pan 62 is raised in a vertical direction to a predetermined hold position as shown in FIG. 1. Next, the robot 40 is moved along the robot tire handling line 54 to the first station A. The manipulator 30 is then moved along the manipulator process line 50 to the first station A on the manipulator process line 50. The top mold half 13 is lifted from the bottom mold half 14 with the manipulator 30. Meanwhile, the tire gripper 47 of the arm 42 of the robot 40 grips the green tire 20 and lifts it from the pan 62. The bottom mold half 14 is moved from the manipulator process line table 24 at the first station A on the manipulator process line 50 to the first station A on the mold load-unload process line 52. The green tire 20 is moved, as the arm 42 of the robot 40 pivots from the pan 62 at the first station A on the green tire delivery process line 56 to the first station A on the mold load-unload process line 52. Next, the green tire 20 is placed into the bottom mold half 14. After that operation, the robot 40 can be moved along the robot tire handling line 54 to any other station as required. For example, the robot 40 may be moved to station B where another green tire 20 may be gripped for placement within another bottom mold half 14.

Once the green tire is placed within the bottom mold half 14, the bladder 86 may be inflated to shape the green tire 20 as is commonly known in the art. Before the green tire 20 is fully shaped by the bladder 86, the bottom mold half 14 is moved to the first station A on the manipulator process line 50. The quick connect couplings 89 permit the chain 88 to separate and the can assembly 82 to move with the bottom mold half 14. The top mold half 13 is placed on the bottom mold half 14 with the manipulator 30 as discussed above. The top mold half 13 is then lowered and locked to the bottom mold half 14 for the rest of the curing process. The manipulator 30 is then free to be moved along the manipulator process line 50 to any other station as may be required. For example, the manipulator 20 may be moved to station B where another tire mold 12 may be opened.

Once the green tire 20 has been cured at the first station A, the manipulator 30 is returned along the manipulator process line 50 to the first station A. The top mold half 13 is then unlocked and lifted from the bottom mold half 14 with the manipulator 30 as discussed above. The bottom mold half 14 is then moved to the mold load-unload process line 52. The newly cured tire 22 is gripped by the tire gripper 47 on the arm 42 of the robot 40 which has been moved to the first station A. The bottom mold half 14 is then either moved to the first station A on the manipulator process line 50 or alternately, it remains at the first station A on the mold load-unload process line 52 where it awaits another green tire 20. The cured tire 22 is moved from the first station A on the mold load-unload process line 52 to the take-away conveyor 16 by the arm 42 of the robot 40.

With reference to FIGS. 1 and 2, it should be noted that the motion of the robot 40 on the platform 41 is straight line motion. By straight line motion it is meant that the platform 41 moves only along a straight line, that is along the horizontal robot tire handling line 54. Thus, no turning, cornering or vertical adjustment of any type is required. The motion of the manipulator 30 is also straight line motion along the manipulator process line 50. Similarly, the motion of any bottom mold half 14 between the manipulator process line 50 and the mold load-unload process line 52 is straight line motion along the given station line. All such straight line motions are an improvement over non-straight line motions because they minimize motion delays for acceleration and deceleration.

The preferred embodiments have been described, hereinabove. It will be apparent to those skilled in the art that the above methods may incorporate changes and modifications without departing from the general scope of this invention. It is intended to include all such modifications and alterations in so far as they come within the scope of the appended claims or the equivalents thereof.

The invention claimed is:

1. A segmented tire mold comprising a top mold half and a bottom mold half including a plurality of segments and self-locking means for selectively locking said top mold half to said bottom mold half, said self-locking means comprising:
   a lock frame,
   a first lock motor supported by said lock frame,
   a first lock rod rotatably connected to said first lock motor, and including a quick connect coupling,
   a lock ring for use in preventing said segments from sliding outwardly, said lock ring being selectively connected to said first lock rod at said quick connect coupling, wherein said first lock motor is adapted to rotate said first lock rod and disconnect said first lock rod from said lock ring at said quick connect coupling, and,
   a lock cylinder operatively connected to said lock frame for use in selectively raising and lowering said lock frame, said first lock motor, said first lock rod and said lock ring, said lock cylinder thereby selectively placing said lock ring around said segmented tire mold.

2. The segmented tire mold of claim 1 further comprising:
   second and third lock motors supported by said lock frame,
   second and third lock rods rotatably connected to said second and third lock motors respectively, said second and third lock rods each including a quick connect coupling,
   wherein said lock ring is selectively connected to said second and third lock rods at said quick connect couplings, and
   wherein said lock cylinder selectively raises and lowers said second and third lock motors and said second and third lock rods.

3. A method for locking a mold with a bottom mold half having a plurality of segments and a top mold half comprising the steps of:
   providing a locking mechanism that includes a lock frame, a first lock motor supported by said lock frame, a first lock rod rotatably connected to said first lock motor and including a quick connect coupling, a lock ring selectively connectable to said first lock rod at said quick connect coupling, and a lock cylinder operatively connected to said lock frame;
   lowering said lock frame via said lock cylinder until said lock ring is positioned around said plurality of segments;
   locking said mold in a closed position;
   driving said first lock motor thereby rotating said first lock rod and disconnecting said first lock rod from said lock ring at said quick connect coupling;
   lifting said locking mechanism away from the mold.

4. The method of claim 3 further comprising the steps of;
   lowering said lock frame until said first lock rod engages said lock ring at said quick connect coupling;
   driving said first lock motor thereby rotating said first lock rod and connecting said first lock rod to said lock ring at said quick connect coupling; and,
   lifting said lock ring away from said mold.

* * * * *